United States Patent
Shurtz et al.

(10) Patent No.: US 9,927,511 B1
(45) Date of Patent: Mar. 27, 2018

(54) LOCATION COMMUNICATION SYSTEM AND METHOD

(71) Applicant: Public Safety Innovations LLC, Littleton, CO (US)

(72) Inventors: Jack Shurtz, Thornton, CO (US); Mark Nathaniel Drennan, Thornton, CO (US)

( * ) Notice: Subject to any disclaimer, the term of this patent is extended or adjusted under 35 U.S.C. 154(b) by 330 days.

(21) Appl. No.: 14/706,884

(22) Filed: May 7, 2015

Related U.S. Application Data

(60) Provisional application No. 61/989,863, filed on May 7, 2014, provisional application No. 62/158,387, filed on May 7, 2015.

(51) Int. Cl.
*G01S 3/02* (2006.01)
*G01S 5/00* (2006.01)
*G08B 25/10* (2006.01)

(52) U.S. Cl.
CPC ............ *G01S 5/0018* (2013.01); *G08B 25/10* (2013.01)

(58) Field of Classification Search
CPC .......... G01S 3/02; G01S 5/0018; G08B 25/10
USPC ....................................................... 342/451
See application file for complete search history.

(56) References Cited

U.S. PATENT DOCUMENTS

| | | | |
|---|---|---|---|
| 2008/0015903 A1* | 1/2008 | Rodgers | G06F 19/327 705/3 |
| 2012/0188074 A1* | 7/2012 | Williams | G06Q 50/26 340/539.13 |
| 2013/0127596 A1* | 5/2013 | Jain | G01S 13/74 340/10.1 |
| 2013/0282280 A1* | 10/2013 | Patterson | G08B 7/062 701/533 |
| 2014/0035726 A1* | 2/2014 | Schoner | G06K 7/10366 340/8.1 |
| 2014/0205155 A1* | 7/2014 | Chung | G06K 9/00362 382/115 |
| 2014/0351881 A1* | 11/2014 | Das | G06F 21/00 726/1 |

FOREIGN PATENT DOCUMENTS

WO    WO 2005088336 A1 *    9/2005    ........... G01S 5/0205

* cited by examiner

*Primary Examiner* — Harry K Liu
(74) *Attorney, Agent, or Firm* — Polsinelli PC; Adam C. Rehm

(57) ABSTRACT

A system configured to provide detailed location information to a user in an emergency by communicating with one or more communication devices having unique identifiers.

16 Claims, 4 Drawing Sheets

LOCATION COMMUNICATION SYSTEM AND METHOD

CROSS-REFERENCE TO RELATED APPLICATIONS

This patent application is a non-provisional patent application of and claims priority to U.S. Patent Application Ser. No. 61/989,863 titled Location Communication System and Method, and filed May 7, 2014, and U.S. Patent Application Ser. No. 62/158,387 titled Location Communication System and Method, and filed May 7, 2015, which are incorporated by reference in their entireties.

BACKGROUND

1. Field

The present inventive concept pertains to a system and method of retrieving, processing, and communicating location information as well as associated information to increase efficiency of action taken in an emergency.

2. Discussion of Related Art

Currently in the cell phone and cellular device market the only ways to locate a mobile device is through the use of GPS and cellular tower triangulation. Even with these conventional systems, there are various problems with respect to accurately calculating the location of wireless devices, mobile devices, multi-line phone systems, and movable IP communications devices, with such locations sometimes impossible to locate accurately in many circumstances.

GPS technology fails to achieve high accuracy location calculation in an urban canyon, natural canyon, and indoors because of challenged ability to receive measurement data from the required number of satellites. Radio Frequency (RF) triangulating systems are unable to achieve a high accuracy location determination when the radio signal has to pass through unknown barriers (walls, ceilings, roofs, etc.). Additionally, changes to these systems are extremely expensive, specifically the GPS systems which are owned by the United States government. Another problem is the length of time required to calculate a location, especially when the location is being used to route 9-1-1 call traffic to the appropriate call center (Public Safety Answering Point).

GPS has several critical flaws for exactly locating a user. For instance, GPS fails at least 70% of the time indoors where most calls/connections originate, and GPS cannot measure a "Z" location (elevation) accurately, which is critical for in-building location determination for applications such as 9-1-1 calls. Also, the accuracy of the calculation for a GPS location is greatly reduced due to the limited line of sight to GPS satellites in challenged environments such as in-doors, natural canyons and urban canyons. The use of cell tower triangulation is even more difficult indoors. The triangulation mathematics doesn't lend itself well to calculating altitude or elevation because the height differences in the triangles being measured is very small. Radio Frequency (RF) triangulation measurements lose accuracy when the radio signal passes through any solid barrier which degrades the signal strength, and impacts the calculation as if the signal had travelled a greater distance. Radio Frequency (RF) triangulation calculations currently cannot generate a location accuracy of less than 150 meters on a regular basis. The current indoor systems available are localized in nature, in most cases require "smart" devices to participate in the location calculation, and they will fail in cases of power failure or local system outages. Other systems do not work as well because they were designed for callers in automobiles or in lightly populated areas outside of urban zones where satellite line of sight is poor. When a user goes indoors most of the assumed variables for a successful location are compromised and either drop the location entirely or fallback to cell face/tower locations which are often measured within kilometers not meters. Normal cellular location was not designed for locating users within buildings or the urban canyons that are most cities. GPS systems require a minimum of 3 satellites to generate a location, in some cases a 4th satellite is required for timing. GPS location calculation can take up to 30 to 40 seconds to calculate a location and may not be very accurate. Mixed GPS and Radio Frequency (RF) triangulation systems tend to generate location determinations that have an accuracy level of greater than 50 meters. These systems come into play when less than 3 satellites are visible.

Thus, there exists a need for a system and method to permit a caller to be located within a much smaller radius and with far greater reliability and having an increased scope with viable national and/or global architecture.

SUMMARY

In response to aforementioned needs, the system and method of the present inventive concept provide a system, i.e., BLIP (BLUETOOTH® Location Identification Platform) and method configured to utilize one or more beacons that in communication with a local receiver, e.g., via BLUETOOTH®, and placed inside buildings throughout each floor in a grid pattern that is measured and stored in the BLS (BLIP Location Server) according to a BLN (BLIP Location Number) assigned to each of the beacons. When a device, e.g., mobile device such as a cellular telephone, smartphone, and/or the like, enters and is within a communication area defined and serviced by the BLIP system, the device registers with the BLS via the Authentication and Request Server (ARS) which authenticates the phone and registers it on the BLN. Any location query performed by the host network, which currently consists of the Mobile Positioning Center (MPC), or the Gateway Mobile Location Center (GMLC), will dip the BLS and the PDE (Position Determination Entity) or the SMLC (Serving Mobile Location Center) simultaneously to allow a determination by the system with respect to what location is best for the given application. The determination may be based on a response timing, which may include, but is not limited to a result of a calculation for a time for a user to respond, a result of a predetermined ability for a user to respond, and/or a general ability to of the system and/or one or more users to respond to information provided by and/or to the system. In addition to or in lieu of the aforementioned, the determination may be based on quality and/or a confidence level with respect to location information, i.e., a quality of location information, which can be determined using publicly-available information from a public database, e.g., a map, and/or a building record, or other information previously gathered and/or otherwise accessible via the system. In this way, if the BLS has access to information available, the system is operable to respond more quickly than the PDE is operable to and do so with an increased quality of information. On the other hand, if the handset is out of range of any BLIP Beacons, e.g., is in an outdoor environment without BLIP Beacons, the Position Determining Entity is operable to respond with the appropriate GPS or Network Location fix without experiencing a processing delay.

It is an object of the present inventive concept to provide a system operable to provide a location of a device within an enclosure or in an environment that is challenging for the present generation of a GPS or Network Radio Frequency Triangulated location delivery.

It is an object of the present inventive concept to provide a system and method with a beacon network operable to generate location determinations with accuracies of 50 meters or less, physical street address information including altitude or elevation, floor number, suite/room number, etc. Using this data, the system is configured to produce information that is similar to information produced by the Automatic Location Identification Databases for wireline devices that were provisioned by Local Exchange Carriers based on the installation records for a wireline phone. The system is also configured to capture, process, and deliver other information, e.g., information that currently generated by a wireless call including, but not limited to a latitude coordinate, a longitude coordinate, and/or an altitude above ellipsoid. The system id configured to deliver the location information to users, e.g., first responders, with a dispatchable address for wireless communication devices instead of a point in space that is described by the X, Y, and Z coordinate delivery. The other information may include a floor plan, a 3D model, and hazardous material information known to be at the location or within a predetermined vicinity, e.g., from 0.01 to 5 miles from the location.

The present inventive concept includes a BLIP Device, i.e., a BLIP beacon operable to generate a BLUETOOTH® signal to a user's handset/device. Each BLIP Device has its own identification number which is encoded into any messaging sessions it performs with another device or element in the system. The beacons are placed in a building or challenged environment. The BLIP beacons are placed in areas such as exit signs, emergency lights, fire/smoke detectors, fans, or other locations that give it coverage over its selected area in a coverage grid. It is foreseen that any one or more of these devices may also be placed independently of any other device, for instance, if required to obtain and/or optimize coverage. Once in place, the exact latitude, longitude and altitude (feet/meters/floors) are entered into the BLIP Server for that BLIP Location Number (BLN). When a handset comes into range of a BLIP Device/beacon, it uses its TCP/IP connection with its home or roaming network to register with the BLIP Server. The handset is given a BLIP Location Number (BLN) when it registers which is matched to its host location. This number is stored in the BLIP Server.

The present inventive concept further includes a Handset/Device configured to utilize its internal BLUETOOTH® capacity to connect with the BLIP Device and to know when to reconnect to a new device. Once that connection is established, it is configured to utilize the BLIP Device's Identifier or BDID to query for a BLN via its own or roaming network TCP/IP connection from the BLIP Server. Once it receives the BLN to device association, the BLIP Server stores it for future use by other Location elements including commercial and emergency applications. Once a handset detects a new BLIP Device, it repeats the process, storing the new query correlation in the BLIP Server.

The present inventive concept further includes a BLIP Device Application, i.e., an application on the targeted BLIP enabled locatable device in which the BLN(s) of the BLIP(s) in range is obtained and forwarded on to the location server. This could be in a burst of 1 to 8 depending on the application configuration and the BLIP Devices visible to the handset/device.

The present inventive concept further includes an Authentication Server, which is an element within a carrier's network that manages the authentication of the registration of the handset/device with its BLIP Server. The authentication server may be used as a firewall for a given network and may or may not be in place. Where used, there may be several Authentication Servers within a carrier's network.

The system of the present inventive concept further includes a BLIP Server configured to match or correlate the BLN to the hosted BDID. The BLIP Server is configured to process information and produce a result thereby causing the BLIP Server to have functionality that is the same as or similar to a Position Determining Entity (PDE) used for GPS and triangulated location calculations. The BLIP server may be configured to be queried by other elements in the network to determine a location of a device, e.g., a mobile device. Information, e.g., the handset's number or Mobile Identification Number (MIN), Mobile Directory Number (MDN), and or the like, may be used in the query of the BLIP Server to identify and obtain a location of a device, e.g., a mobile device. The BLIP Server (BLS) and the BLUETOOTH® Location Database Server (BLDBS) are provisioned by the installer of the BLIP device. This can be done through a simple web entry of the BDID and its address/detailed location information into the BLIP server. This entry will include the address of the device and its location (to include the floor as well as comments about the location). Ideally, the location will be entered using a device that is able to convey the latitude and longitude as well as altitude automatically with the height being manually entered until automated mobile devices can calculate their height for provisioning. The records in the BLIP Server will be made available to location servers and applications in the network or systems attached to those networks via TCP/IP or other similar networks. The BLIP Server is also configured to take BLIP Device information from multiple devices and calculate a more exact location than would be possible using a single BLIP Device in a single location.

The present inventive concept is configured for use with logic to locate which BLN corresponds to a given X, Y, and Z. It is foreseen that further logic may be utilized to locate the handset/device by using spatial calculation of the target's location via the use of 2 or more additional BLIP BLN's. The geometry of these additional elements are used to calculate the location of the device/handset based on the number of BLNs available. It is foreseen that this calculation could take place in the BLIP Device Application, or an application on the handset, mobile device or the BLIP Server.

It is foreseen that after the BLIP Devices are placed in the target area, they are registered in the BLIP Server. Using the server, an incoming location request may be matched in a tabular fashion to the BLIP location and that of the requesting device. The BLIP Server or the application in the BLIP enabled device may also obtain a range of BUN When installing the system of the present inventive concept, the BLIP device is first placed in its desired location then its location is entered into the BLIP Server via a TCP/IP connection. The BLIP Server then records its information in a database where the information can be drawn from when a device tries to make a location calculation. Depending on the configuration per the application on the handset or device trying to get location, the system is configured to send a location query that includes the BDID or BLN to the BLIP Server where the location is stored. It is then returned to the device and/or the requesting network application (such as a Position Determination Entity or Mobile Positioning Center). Alternatively, it is foreseen that higher accuracy may be achieved by the Application via return of the three strongest BLIP signals it is capable of seeing or utilizing so that it might give the BLIP Server the ability to triangulate the best X, Y, and Z coordinate of the device. This would further focus the location down to a matter of feet or sub-meter level of accuracy.

The BLIP Device and the BLIP Server are necessary components of the system and method of the present inventive concept. The Authentication Server is configured to provide further privacy protection by allowing only certain devices to be located at certain times much like a firewall. Also, it prevents unnecessary accessing of the BLIP Server's data by other devices. It is foreseen that the server could be configured to broadcast information to/from the matrix of BLIP Device location information to the devices as they traverse through the different areas set aside by the BLIP Server.

It is foreseen that the location application on the device and/or the BLIP Server could perform the function of triangulation. The BLIP Server would be ideal while the location on the device is possible if it is fed the matrix of location information about the device's environment by the BLIP Server.

It is foreseen that the system of the present inventive concept may be configured for interior mapping and navigation applications similar to or the same as those in use to determine driving conditions on roads on maps furnished by GOOGLE®. With this information that is collected by the system, the system is operable to generate a two and/or three dimensional models of various building or location for reference. This information may also be used to show a path to a location that a user is trying to get to, or a safest path of egress from a building or environment during an emergency. Using one or more sensors of the present inventive concept, the system is operable to detect, monitor, and report issues associated with heat, smoke, chemicals, pressure, proximity of known things like walls and stairways, etc. Using proximity data, the system is configured to eliminate areas that may have collapsed or may be hazardous to personnel attempting to use an egress route. For instance, at a point in a route that has become compromised, the system is configured to detect such, calculate an alternate route, and notify the user of the detected issue and the alternate route. This system is also configured to provide information associated with a condition of a building to first responders. The system is configured to send such information using a long range transmitter and antenna, and/or a WiFi/LTE transmitter and antenna that is correlated by a server and/or a smartphone or handset application thereby providing increased transmission capabilities than what is available in a base device with only a short range transmitter and a shielded antenna that are used for sending a BLN or BDID.

It is foreseen that the system of the present inventive concept may be include a network of devices configured to communicate with each other and track expected neighboring devices thereby allowing the system to analyze and report information associated with one or more of the devices that are not functioning or have been tampered with.

It is foreseen that the system of the present inventive concept may be operable to track first responders, e.g., via an application, and tie their individual locations with a known environment mapped out for them. This environment can be aided by database information that records hazardous materials, physical threats etc. The same kind of functionality can be used by parents to track their children, or people to find their pets. Lost devices can also be found if necessary.

It is foreseen that the system of the present inventive concept may be operable to identify test locations for handset GPS and Triangulation by providing a highly accurate ground truth to be used in association with the GPS or Network based calculated location information.

It is foreseen that the system of the present inventive concept may be operable to collect location information to be associated with indoor Radio Frequency Performance that can be collected passively to assist in Network tuning and optimization. It is foreseen that the system of the present inventive concept may be operable to supply location information to FemtoCell, Repeater or Small Cell antenna systems that are deployed in buildings to improve wireless network performance.

It is foreseen that the system of the present inventive concept may be operable to collect location information using an active scenario where data is requested by an on-board application on a phone or device, or a network entity like an MPC or GMLC that is requesting information for a Location Based Services Application, or Emergency Call Routing. It is foreseen that the system of the present inventive concept may be operable to collect location information using a passive mode much like the RF Networks collect cell site information and signal strengths for call hand-offs between towers as the mobile subscriber moves throughout the physical network, and needs to change between call serving equipment to assure that the calls performance is maintained and the call isn't dropped. This passive information can be collected periodically by the MSC, HLR, HSS, MME, etc. This data can be used to locate a subscriber outside of an emergency call or LBS application in cases where foul play may be expected. The location data collected would be for any Devices that are in range of the subscribers device, and would include the BDID, BLN, and Signal Strength were available.

It is foreseen that the system of the present inventive concept may be operable to collect location information using a single device so that location accuracy is the same as a transmit range of the device in the recorded environment. It is foreseen that the system of the present inventive concept may be operable to generate a refined or calculated fixed location utilizing information from multiple devices in view of their respective signal strengths, which would have increased accuracy and a reduced error measurement than use of the single device.

It is foreseen that the system of the present inventive concept may be operable to generate a dispatchable address to the user by collecting and processing the aforementioned information.

It is foreseen that the system of the present inventive concept may be configured as to provide credit card, banking fraud, and/or identity theft protection to a user by validating whether or not a valid user's mobile device is present in an area during use of a credit card transaction, a bank transaction, or the like transaction. The user may be further validated by the system using a biometric sensor, e.g., fingerprint, facial recognition, associated with the mobile device and/or another device associated with the transaction.

It is an object of the present inventive concept to provide a location matrix of signals in a target area to reference any BLUETOOTH® devices traversing that area that have the ability to perceive the BLIP device and via an onboard application send a TCP/IP request via the mobile internet to its designated BLIP Server for location identification. This may be accomplished via a person walking past stores or by a plane passing BLIP Devices imbedded in a runway. Either way, a reading device such as a mobile phone or a BLUETOOTH® navigation device reads in near real-time its location to a matter of feet of its location. As the technology improves there will be the use of advanced triangulation of the BLUETOOTH® signals to further refine its location accuracy.

It is foreseen that the present inventive concept may be used by military applications in which one needs a low-cost way to mark an item or an area and then tell when another device or item enters that area. Similarly, it is foreseen that the present inventive concept may be used to replace RFID tagging currently used today for logistical management of an inventory of items by showing their number and location in reference to BLIP Devices placed in a warehouse area.

It is an object of the present inventive concept to utilize BLIP devices that are placed in the targeted area, a BLIP Server, and an Authentication/Registration server all to be used to orchestrate target acquisition.

BRIEF DESCRIPTION OF THE DRAWINGS

The present inventive concept is described in detail below with reference to the attached drawing figures, wherein.

Figure 1:
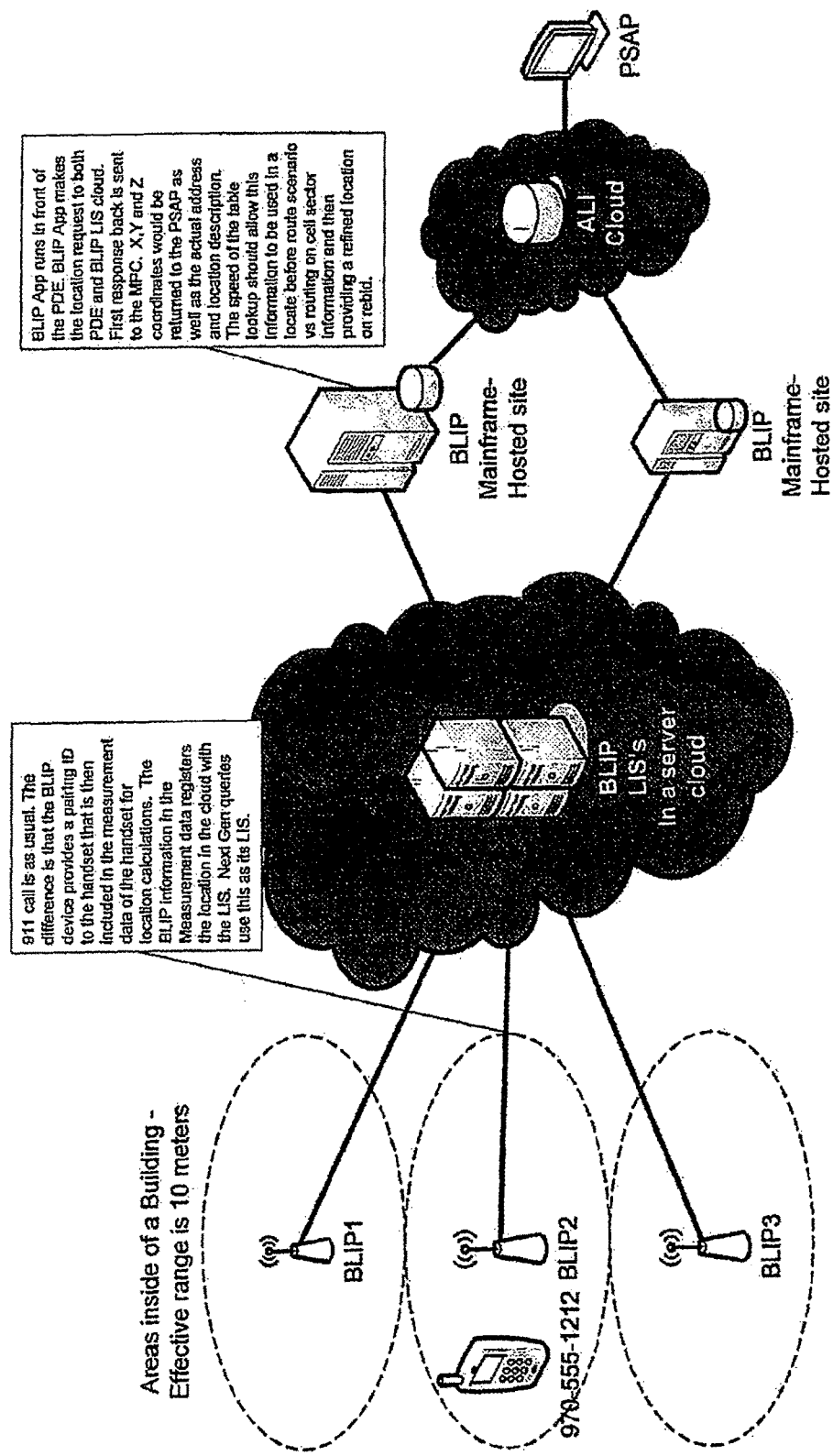
FIG. 1 is a diagram illustrating an example of a process and communication network of the present inventive concept.

The drawing figures do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate various embodiments of the present disclosure. The illustrations and description are intended to describe aspects and embodiments of the present disclosure in sufficient detail to enable those skilled in the art to practice the present disclosure. Other components can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

I. Terminology

In the following detailed description, terminology is used to describe features of the present disclosure. For example, references to terms "one embodiment," "an embodiment," or "embodiments" mean that the feature or features being referred to are included in at least one aspect of the present disclosure. Separate references to terms "one embodiment," "an embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present disclosure may include a variety of combinations and/or integrations of the embodiments described herein. Additionally, all aspects of the present disclosure as described herein are not essential for its practice.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The term "BLUETOOTH®" means a wireless technology operable to exchange data over short distances, e.g., using short-wavelength UHF radio waves in the ISM band from 2.4 to 2.485 GHz from one or more fixed or mobile devices that can be simultaneously connected to one or more area networks.

The acronym "ARS" means Authentication and Request Server, which is a server used to authenticate the phone and registers it on the BLUETOOTH® Location Server (BLS), and communicate information, e.g., a number used to identify a handset or wireless device such as the Mobile Identification Number or MIN, the Mobile Directory Number or MDN, etc.

The acronym "BDID" means BLUETOOTH® Device Identifier, which is an encrypted number that can be used for the secure transmission of location information that is then tied to the BLUETOOTH® Location Identification Number instead of having the BLUETOOTH® Device send the BLUETOOTH® Identification Number Directly through the network. The association of the BDID and the BLIN may be performed via a query to the BLUETOOTH® Location Database Server by the BLUETOOTH® Location Server Application.

The acronym "BLIP" means BLUETOOTH® Location Identification Platform, which is the system of the present inventive concept.

The term "blip" is defined as a BLUETOOTH® location identification point or position, and is normally a position in a building or other environment where a BLUETOOTH® Beacon/BLIP Device may be placed, and have a BLUETOOTH® Location Identification Number (BLIN) assigned to it.

The acronym "BLINT" means BLUETOOTH® Location Identification Number Transmitter. A BLIP device or beacon is configured to transmit the BLUETOOTH® Location Number that is used by the system of the present inventive concept to reference location information.

The acronym "BLIN" means BLUETOOTH® Location Identification Number, which is a unique number used by the system as a reference key to obtain the location information associated with a location by the number. This number can either be referenced with a BDID sent by the BLIP Device, or it can be sent directly by the BLIP Device depending on the configuration and security needs of the network.

The acronym "BLIND" means BLUETOOTH® Location Identification Number Data, which include data associated with the BLUETOOTH® Location Number. The BLIND can include extensive data and data that is cross referenced across one or more databases, which is processed and associated together by the BLUETOOTH® Location Information Number or BLIN.

The acronym "BLS" means BLUETOOTH® Location Server, which is a network element that is configured to communicate between the BLUETOOTH® Location Databases, the web based tools for reporting and provisioning of devices and their individual capabilities and health, and other communication network elements depending on a configuration of the system. The BLS is also configured to communicate with the ARS to determine, for instance, if a mobile device has been registered, and whether a corresponding BLUETOOTH® Location Number, Numbers, and signal strengths are available for location calculation and communication for use by applications, or network elements, e.g., the MPC or GMLC for call routing and location delivery to Public Safety Answering Points, Dispatch Centers, or first responders.

The acronym "BLDBS" means BLUETOOTH® Location Database Server.

The acronym "BLN" means BLIP Location Number, which is similar to/same as the BLIN BLUETOOTH® Location Identification Number.

The acronym "MPC" means Mobile Positioning Center, which is a network element configured for use within CDMA Networks for providing location information and routing instructions utilized for emergency calls, e.g., a 911 call, processing, and/or for Commercial Location Based Services such as mobile mapping and navigation applications.

The acronym "MSC" means Mobile Switching Center, which is a network element configured to use in mobile communication networks to provide call set up and handling between mobile devices, handsets, etc. and wireless communication towers, antennas and networks as well as the wireline trunking required for call setup and delivery.

As the present disclosure is susceptible to embodiments of many different forms, it is intended that the present disclosure be considered as an example of the principles of the present disclosure and not intended to limit the present disclosure to the specific embodiments shown and described.

II. General Architecture

Figure 2:
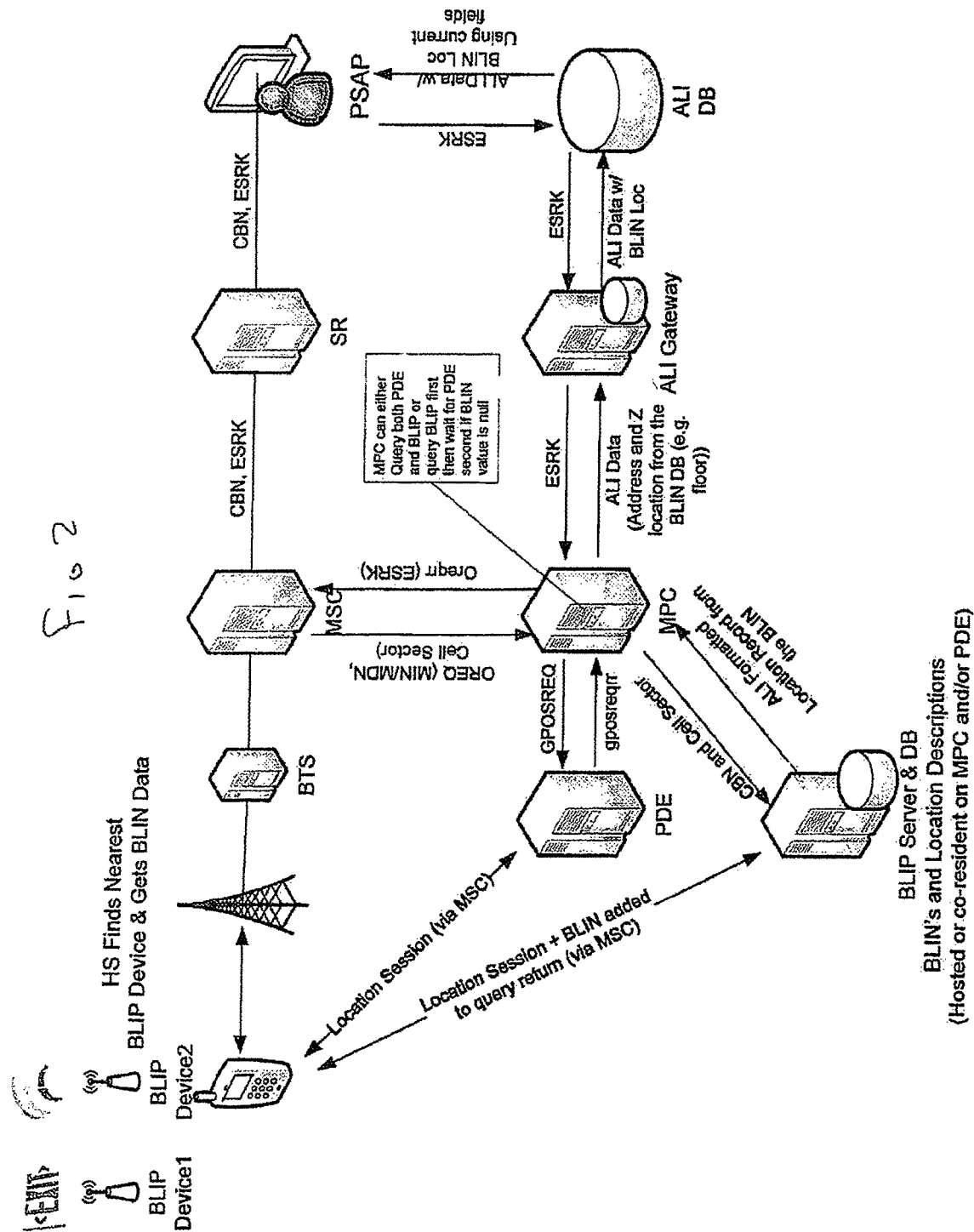
FIG. 2 is a diagram illustrating an example of a process and communication network of the present inventive concept.
Figure 3:
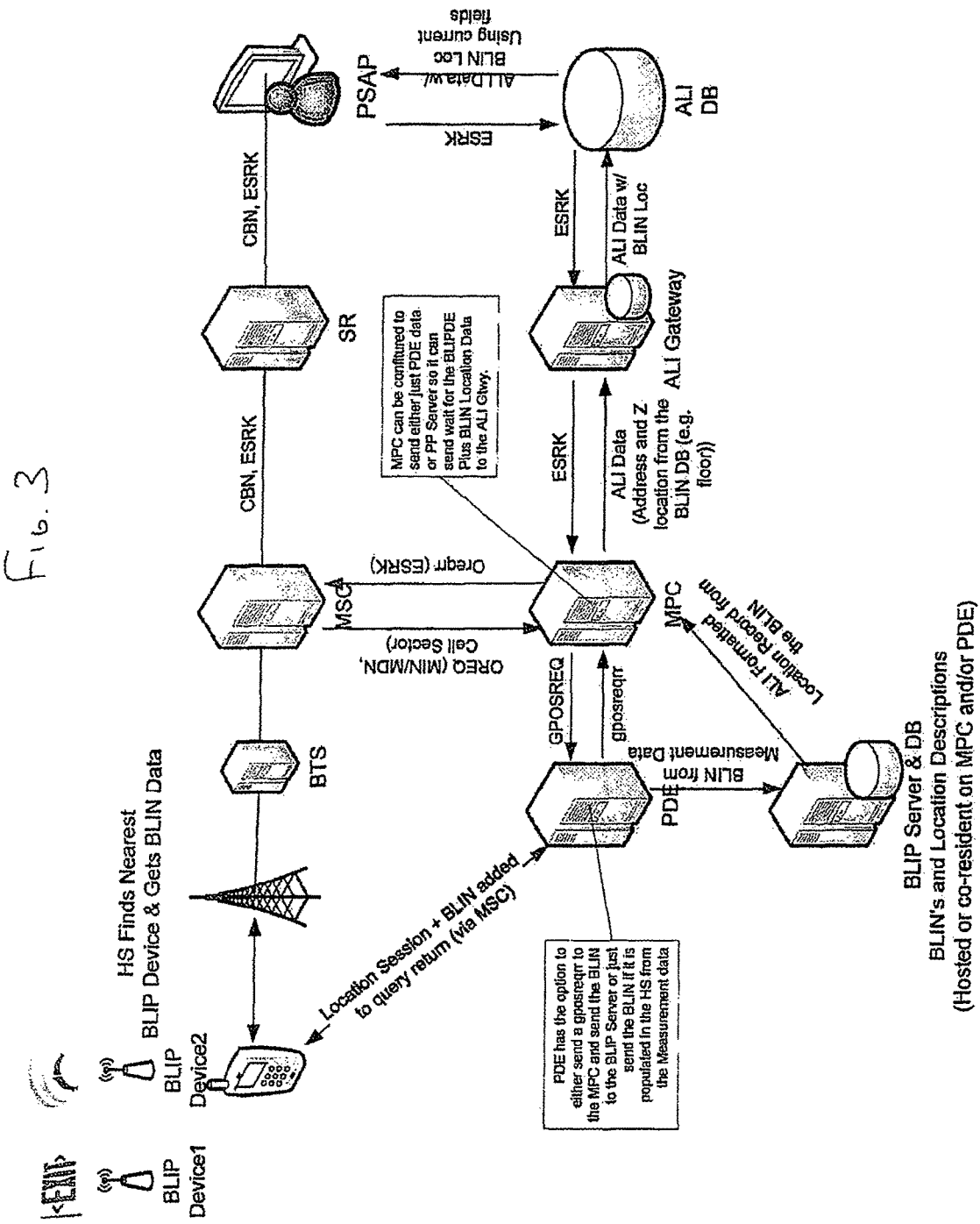
FIG. 3 is a diagram illustrating an example of a process and communication network of the present inventive concept.
Figure 4:
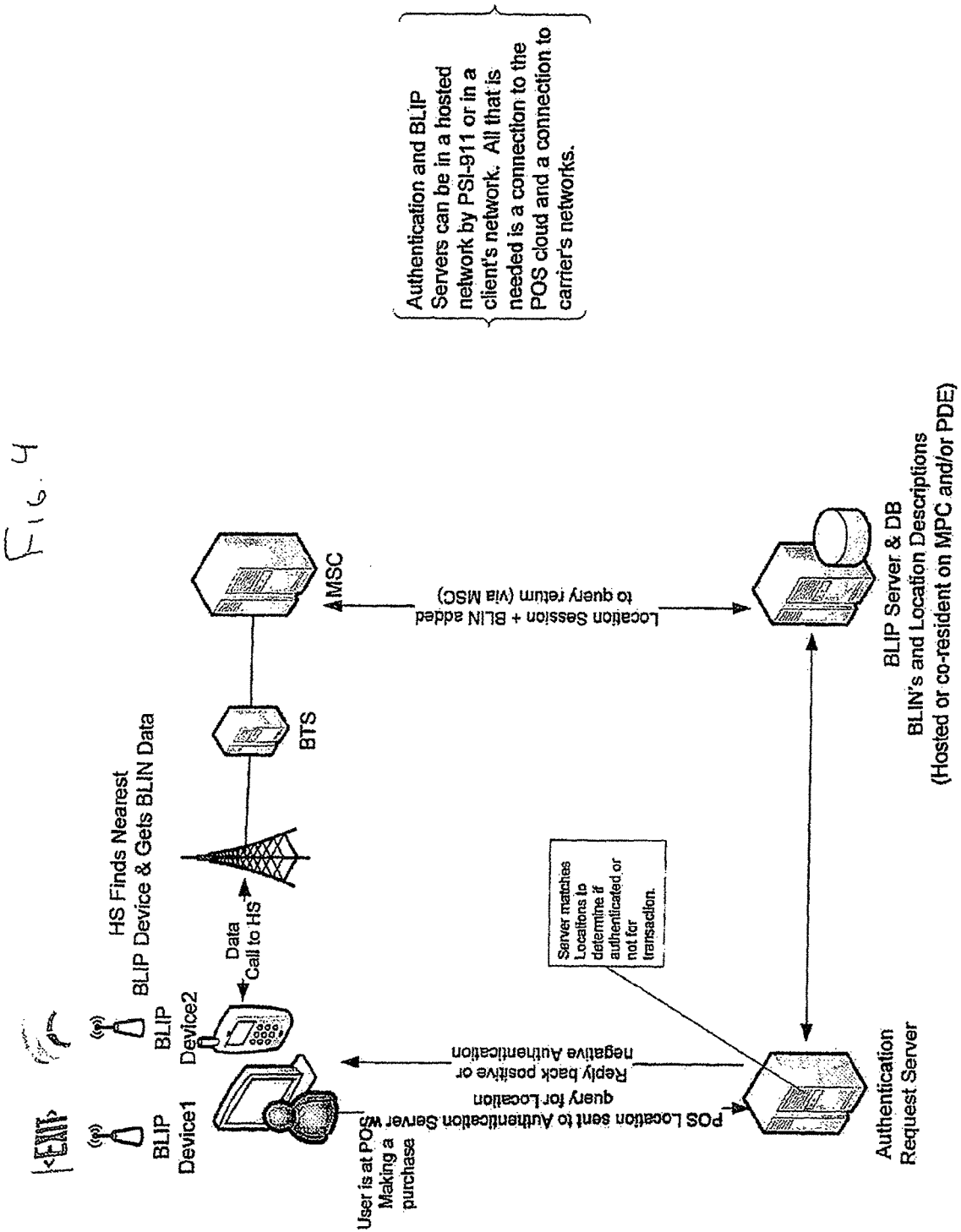
FIG. 4 is a diagram illustrating an example of a process and communication network of the present inventive concept.

Turning to FIGS. 1-4, embodiments of the present disclosure provide a system and method operable to utilize one or more communication beacons, e.g., communication devices, connected to a server, e.g., via BLUETOOTH® or the like. Each of the beacons is placed in a predetermined location, e.g., in, outside of, or about a building or other structure, and configured for use with one or more mobile devices. Each of the beacons has a predetermined, adjustable broadcast area or scope of coverage. Each of the beacons has a unique identifier independent identification and reference of each within a database, e.g., a specially keyed database. In this manner, the system may rapidly identify and retrieve information associated with each one or a plurality of the beacons upon demand by a user of the system and method.

The information in the database includes, but is not be limited to, latitude, longitude, and altitude information, e.g., X, Y, and Z coordinates, stored data for mapping and location specific information relative to each of the one or more beacons to permit rapid identification of a location of the one or more beacons as well as associated information that could be useful to emergency personnel. For instance, proximity of the location to known hazards such as hazardous materials, hazardous geographical features, and/or hazardous activities. The system is configured to combine all of this information into an information packet and transmit the packet to the user.

Although this specification and accompanying figures describe one or more examples of a process that may be performed by a communication system using one or more beacons in communication with one or more servers to enable identification of a location of one or more mobile devices within a proximity to the one or more beacons. All of the aforementioned elements are part of the system of the present inventive concept. The features of the disclosed processes may be embodied in other specific forms without deviating from the spirit and scope of the present disclosure. For example, various elements, e.g., servers and beacons may perform additional, fewer, or different operations than those operations as described in the present example.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic device) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

A machine readable medium includes any mechanism for storing or transmitting information in a form (e.g., software, processing application) readable by a machine (e.g., a computer). Such media may take the form of, but is not limited to, nonvolatile media and volatile media. Nonvolatile media includes optical or magnetic disks. Volatile media includes dynamic memory, such as a main memory. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A location identification system comprising:
   at least one transmitter (i) retrofitted to another electronic device that is affixed to a surface of a residential enclosure or a business enclosure, and (ii) having an identifier;
   a position determining unit configured to process the identifier and determine a position of the at least one transmitter; and
   a communication device configured to (i) communicate with the at least one transmitter and the position determining unit, and (ii) cause the position of the at least one transmitter to be communicated to a remote receiver outside the residential enclosure or the business enclosure,
   wherein,
   the another electronic device is configured as at least one of a sign, an emergency light, or a detector,
   the another electronic device is affixed to the surface in the residential enclosure or the business enclosure at a predetermined distance to at least one other object, and
   the at least one other object is configured to provide egress or ingress.

2. The system according to claim 1 wherein, the system is configured to communicate the identifier from the at least one transmitter upon activation of the at least one transmitter.

3. The system according to claim 1 wherein, the communication device is of a user adjacent to or within the residential enclosure or the business enclosure.

4. The system according to claim 3 wherein, the mobile communication device of the user is configured to be utilized by an emergency response service to identify a location proximate to the user.

5. The system according to claim 4 wherein, the location proximate to the user includes an X axis, a Y axis, and a Z axis.

6. The system according to claim 3 wherein, the mobile communication device includes geofence area information.

7. The system according to claim 1 wherein, the system of the present inventive concept utilizes geofence area information to obtain regional location information via referencing a regional location information data table identifier.

8. The system according to claim 1 wherein, wherein the position determining unit is of an emergency response service.

9. The system according to claim 1 wherein, the remote receiver is of an emergency response service.

10. The system according to claim 1 wherein, the at least one transmitter is configured to communicate via a wireless technology using UHF radio waves.

11. The system according to claim 1 wherein, the detector is configured to detect at least one of smoke, a temperature, light.

12. The system according to claim 1 wherein, the sign is an exit sign or a storefront sign.

13. The system according to claim 1 wherein, the surface is at least one of a wall, ceiling, and floor.

14. The system according to claim 1 wherein, the identifier is a unique serial number representative of a location of the at least one transmitter.

15. A method of locating a device comprising the steps of:
   determining a position of at least one transmitter via a position determining unit configured to (i) process a unique identifier of the at least one transmitter, and (ii) determine the position based on the processing of the unique identifier; and
   causing the position of the at least one transmitter to be communicated from a communication device to a remote receiver,
   wherein,
   the at least one transmitter is retrofitted to another electronic device that is affixed to a surface of a residential enclosure or a business enclosure,
   the another electronic device is configured as at least one of a sign, an emergency light, or a detector,
   the another electronic device is affixed to the surface in the residential enclosure or the business enclosure at a predetermined distance to at least one other object,
   the at least one other object is configured to provide egress or ingress, and
   the remote receiver is outside the residential enclosure or the business enclosure.

16. A location communication network comprising:
   a plurality of transmitters (i) retrofitted to other electronic devices affixed to one or more surfaces of a residential enclosure or a business enclosure, and (ii) each having a unique identifier;
   a position determining unit configured to process the unique identifiers and determine positions of the plurality of transmitters; and
   a communication device configured to (i) communicate with plurality of transmitters and the position determining unit, and (ii) cause the positions of the plurality of transmitters to be communicated to a remote receiver outside the residential enclosure or the business enclosure,
   wherein,
   the another electronic device is configured as at least one of a sign, an emergency light, or a detector, the another electronic device is affixed to the surface in the residential enclosure or the business enclosure at a predetermined distance to at least one other object, and the at least one other object is configured to provide egress or ingress.

\* \* \* \* \*